United States Patent [19]
Yamamoto

[11] Patent Number: 5,606,537
[45] Date of Patent: Feb. 25, 1997

[54] METHOD OF ADJUSTING OPTICS OF OPTICAL PICKUP USING ERROR NEGATING SIGNAL PROCESSING TECHNIQUE

[75] Inventor: Etsufumi Yamamoto, Chiba, Japan

[73] Assignee: Sony Corporation, Japan

[21] Appl. No.: 492,549

[22] Filed: Jun. 20, 1995

[30] Foreign Application Priority Data

Jun. 24, 1994 [JP] Japan ................................. 6-166382

[51] Int. Cl.$^6$ .................................................. G11B 7/09
[52] U.S. Cl. .................................. 369/44.41; 369/44.42
[58] Field of Search ........................... 369/44.12, 44.23, 369/44.41, 44.42, 103, 109, 112, 44.14, 44.32, 54

[56] References Cited

U.S. PATENT DOCUMENTS

| | | | |
|---|---|---|---|
| 4,823,331 | 4/1989 | Yoshitoshi et al. | 369/112 |
| 5,283,771 | 2/1994 | Kadwaki et al. | 369/103 |
| 5,406,543 | 4/1995 | Kobayashi et al. | 369/130 |
| 5,481,386 | 1/1996 | Shimano et al. | 369/44.12 |

*Primary Examiner*—Thang V. Tran
*Attorney, Agent, or Firm*—Ronald P. Kananen

[57] ABSTRACT

Method of adjusting optics of an optical pickup using a light-emitting-and-receiving device comprising a semiconductor substrate on which a light-emitting portion and a light-receiving portion are integrally formed. The light-receiving portion consists of a first array and a second array of light-emitting elements. These two arrays are in line in the tracking direction of an optical disk. The light-emitting elements of each array are arrayed in the radial direction of the disk. The output signals from the light-emitting elements of these two arrays are summed up to produce a control signal. The position of the light-emitting-and-receiving device is adjusted in response to the control signal.

2 Claims, 8 Drawing Sheets

METHOD OF ADJUSTING OPTICS OF OPTICAL PICKUP USING ERROR NEGATING SIGNAL PROCESSING TECHNIQUE

BACKGROUND OF THE INVENTION

1. Field of the Invention

The present invention relates to an optical pickup for playing back or reading an optical disk and, more particularly, to a method of adjusting optics of an optical pickup using a light-emitting-and-receiving device comprising a semiconductor substrate on which a light-emitting portion and a light-receiving portion are integrally formed.

2. Description of the Related Art

The prior art optical pickup which is for use with an optical disk and uses a light-emitting-and-receiving device is described in U.S. Pat. No. 4,823,331. The construction of the prior art optical pickup is particularly shown in FIG. 1.

Figure 1:
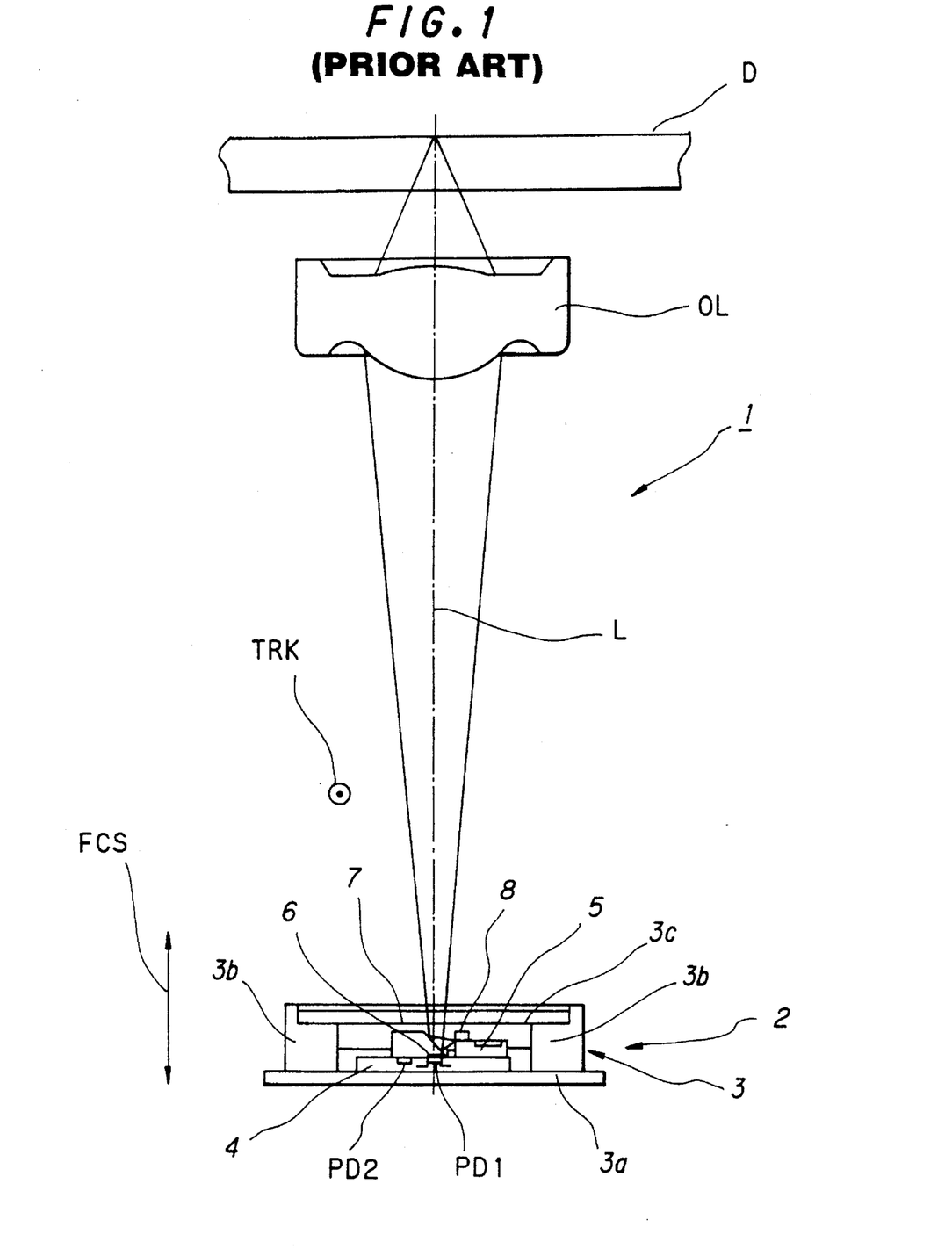
FIG. 1 is a schematic view of a known optical pickup used in an optical disk drive.

In FIG. 1, the optical pickup is generally indicated by reference numeral 1. This pickup 1 includes a light-emitting-and-receiving device 2 (described later) and an objective lens OL disposed between the device 2 and an optical disk D. This lens OL is held by a support mechanism (not shown) so as to be capable of moving in the tracking direction TRK and also in the focusing direction FCS. The optical disk D is rotated by a driving source (not shown).

Figure 2:
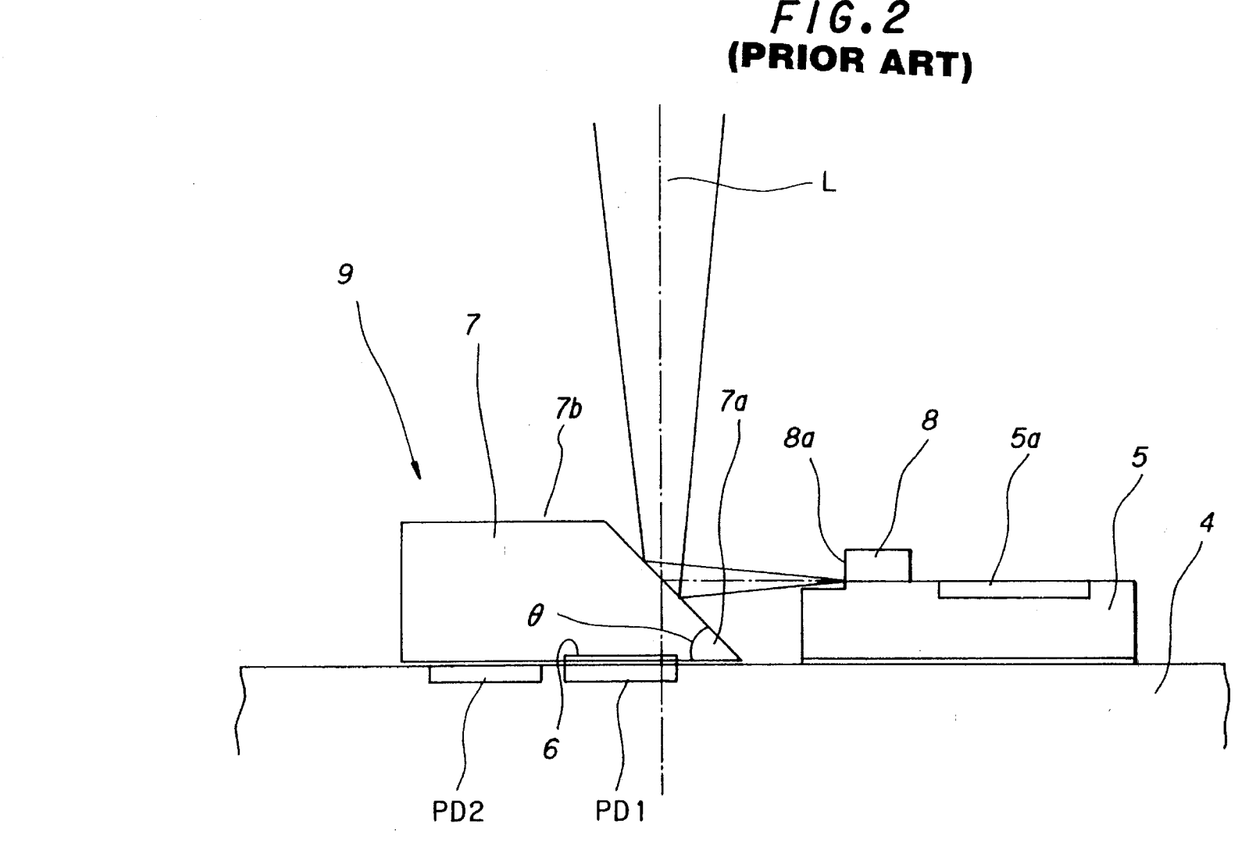
FIG. 2 is an enlarged view of a light-emitting-and-receiving device included in the optical pickup shown in FIG. 1.

The light-emitting-and-receiving device 2 is constructed as shown in FIGS. 1 and 2. In particular, a prism 7 and a photodiode device 5 are fixedly mounted on a semiconductor substrate 4. A laser diode device 8 is securely mounted on the photodiode device 5. A first array of photodetectors PD1 and a second array of photodetectors PD2 are mounted on the surface of the semiconductor substrate 4 on which the prism 7 is mounted.

As shown in FIG. 2, the prism 7 has an inclined surface 7a which is tilted, for example, at an angle of θ to the bottom surface of the prism 7. Preferably, this angle θ is 45 degrees. The laser diode device 8 has a laser light exit portion 8a to which the inclined surface 7a is disposed substantially in an opposite relation. The inclined surface 7a reflects the light beam coming out of the laser light exit portion 8a toward the objective lens OL. The inclined surface 7a is a translucent surface through which the light beam reflected off the disk D is transmitted. The inclined surface 7a has a totally reflective surface 7b opposite to the surface held on the semiconductor substrate 4.

A light-receiving portion 5a for monitoring the laser light is formed on the photodiode device 5. This light-receiving portion 5a receives the laser light emerging from the rear side of the laser diode device 8 and detects the amount of beam coming out of the laser diode device.

A translucent membrane 6 is formed on the first array of photodetectors PD1. The membrane 6 transmits a part of the light beam transmitted through the inclined surface 7a of the prism 7; the remaining part is reflected by the membrane 6. The beam transmitted through the membrane 6 is guided to the first array of photodetectors PD1.

Referring again to FIG. 1, the light-emitting-and-receiving device 2 has a casing 3 which is composed of a substrate 3a, four side plates 3b, and a window glass 3c. The substrate 3a is positioned opposite to the window glass 3c which consists, for example, of transparent glass plate.

In the operation of the optical pickup 1 constructed in this way, the light beam L emitted from the laser diode device 8 is reflected by the inclined surface 7a of the trapezoidal prism 7 and is passed through the objective lens OL. During this process, the light is refracted by the action of the objective lens OL and focused onto the recording surface of the optical disk D. The light returning from the recording surface of the disk D travels to the inclined surface 7a of the prism 7 again via the objective lens OL.

Figure 3:
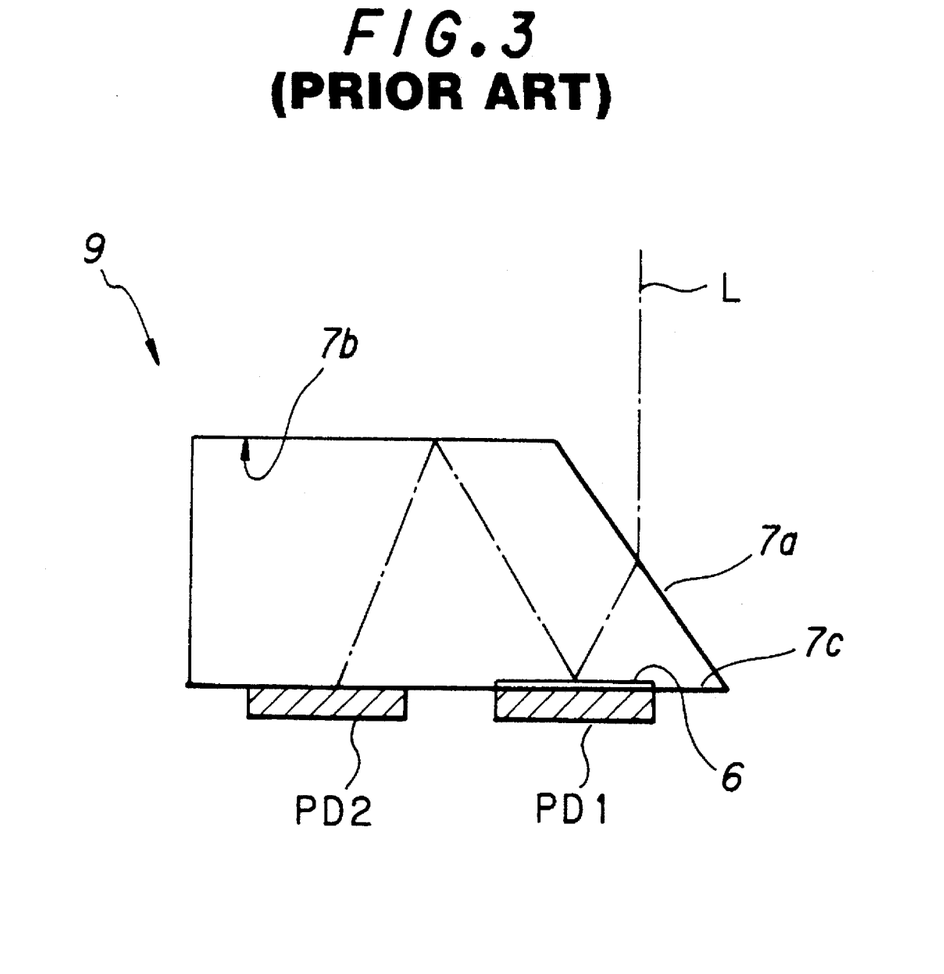
FIG. 3 is an enlarged cross section of the prism, the first array of photodetectors, and the second array of photodetectors shown in FIG. 2.

A part of the returning light enters into the prism 7 from the inclined surface 7a of the prism 7. As shown in FIG. 3, a part of the returning light transmitted through the inclined surface 7a passes through the translucent membrane 6 and enters the first array of photodetectors PD1.

The remaining part of the returning light transmitted through the inclined surface 7a is reflected off the translucent membrane 6, is reflected by the totally reflective surface 7b, and enters the second array of photodetectors PD2.

Appropriate calculations are performed on the output signals from those of the photodetectors PD1 of the first array which receive the light and on the output signals from the other photodetectors PD1. In this way, servo signals necessary for focusing and tracking are obtained.

In the optical pickup 1 of this construction, adjustment of optics of the light-emitting-and-receiving device in a radial direction of the optical disk, i.e., an adjustment of the position at which the pickup is mounted, is made by mechanically mounting the light-emitting-and-receiving device relative to the reference position of the pickup. On the other hand, in the track direction of the optical disk, the position of the light-emitting-and-receiving device is not adjusted. The position in the track direction is determined by the accuracy of the mechanism.

Consequently, the accuracies at which the light-emitting-and-receiving device is mounted in the radial direction and in the tangential direction of the optical disk are affected by the assembly accuracy of the optical pickup and by the mounting accuracies of the optical elements in the light-emitting-and-receiving device. In some cases, the optical axis deviates because of errors in the position at which the pickup is mounted.

SUMMARY OF THE INVENTION

In view of the foregoing problems, it is an object of the present invention to provide a method of adjusting optics of the optical pickup in such a way that the position of a laser coupler can be easily adjusted in a radial direction.

The above-described object is achieved in accordance with the teachings of the invention by a method of adjusting optics of an optical pickup including a light-emitting-and-receiving device and an objective lens. The light-emitting-and-receiving device comprises a substrate on which a light-emitting portion and a light-receiving portion are formed. The objective lens focuses a light beam from the light-emitting portion onto the recording surface of an optical disk and directs a returning light reflected by the recording surface toward the light-receiving portion. The light-receiving portion is divided into a first array of light-receiving elements and a second array of light-receiving elements which are in line in the track direction of the optical disk. Each of the first and second arrays of the light-receiving elements is composed of plural light-receiving elements arrayed in a radial direction of the optical disk. This method comprises the steps of: adding output signals from the light-receiving elements arranged on a first side of the first array to output signals from the light-receiving elements arranged on a second side of the second array to produce a first sum signal; adding output signals from the light-receiving elements arranged on the second side of the first array to output signals from the light-receiving elements arranged on the first side of the second array to produce a second sum signal; producing a difference signal between the first sum signal and the second sum signal; and making an adjustment so as to move the light-emitting-and-receiving device in the radial direction of the optical disk in such a way that an offset of the difference signal decreases down to zero.

The above-described object is also achieved in accordance with the teachings of the invention by another method adjusting optics of an optical pickup including a light-emitting-and-receiving device and an objective lens. The light-emitting-and-receiving device comprises a substrate on which a light-emitting portion and a light-receiving portion are formed. The objective lens focuses a light beam from the light-emitting portion onto a recording surface of an optical disk and directs returning light reflected by the recording surface toward the light-receiving portion. The light-receiving portion is divided into a first array of light-receiving elements and a second array of light-receiving elements which are in line in the track direction of the optical disk. Each of the first and second arrays of the light-receiving elements is composed of plural light-receiving elements arrayed in a radial direction of the optical disk. This method comprises the steps of: adding output signals from plural outer light-receiving elements of the first array to an output signal from at least one inner light-receiving element of the second array to produce a first sum signal; adding output signals from at least one inner light-receiving element of the first array to output signals from plural outer light-receiving elements of the second array to produce a second sum signal; comparing the first and second sum signals; and making an adjustment so as to move the light-emitting-and-receiving device in the track direction of the optical disk in such a way that the second sum signal equals the first sum signal.

In these methods, when the light-emitting-and-receiving device is located in a given position in the radial direction of the disk, the first and second sum signals together create a push-pull signal which exhibits the same amplitude in the positive and negative domains with respect to ground level.

In this case, therefore, the offset of the push-pull signal is zero. When the light-emitting-and-receiving device deviates from the given position in the radial direction, the offset of the push-pull signal created from the first and second sum signals is shifted in the positive or negative direction.

The light beam emitted from the light-emitting-and-receiving device is directed to the recording surface of the optical disk via the objective lens. Light returning from the disk is received by the light-receiving portion. The light-emitting-and-receiving device is moved in the radial direction of the disk in such a manner that the offset of the difference signal between the first sum signal and the second sum signal decreases down to zero. Consequently, the light-emitting-and-receiving device is accurately placed in position in the radial direction of the optical disk.

In the above-described methods, if the light-emitting-and-receiving device is placed in position in the track direction of the optical disk (in the case of an optical disk engraved with pits to record data, in the direction of the pits), then an AC value indicating the amplitude of the first sum signal is equal to an AC value indicating the amplitude of the second sum signal. That is, the two peaks in the opposite domains have the same amplitude. If the light-emitting-and-receiving device is out of position in the track direction of the optical disk, the AC values of the first and second sum signals have the same peak value but their bottoms vary.

Thus, a light beam is directed from the light-emitting portion of the light-emitting-and-receiving device to the recording surface of the optical disk via the objective lens. Light returning from the disk is received by the light-receiving portion. The second sum signal is compared with the first sum signal. The light-emitting-and-receiving device is moved in the track direction so that these two sum signals assume the same AC value. As a result, this light-emitting-and-receiving device is accurately placed in position in the track direction.

Other objects and features of the invention will appear in the course of the description thereof, which follows.

DESCRIPTION OF THE PREFERRED EMBODIMENTS

Since examples which are to be described are preferred embodiments of the present invention, technically preferred various limitations are placed thereon. It is to be understood that the scope of the invention is not limited to these embodiments unless otherwise stated specifically.

Figure 4:
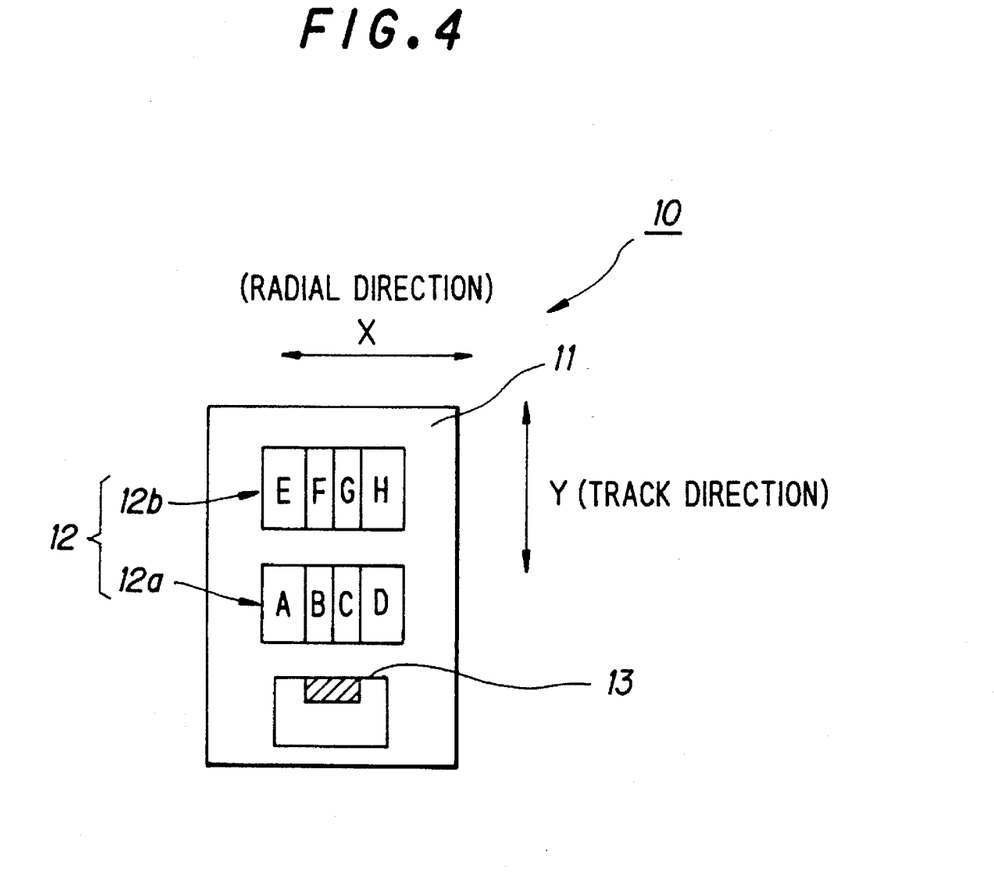
FIG. 4 is a schematic plan view of a light-emitting-and-receiving device included in an optical pickup according to the invention, the optical pickup being incorporated in an optical disk drive.
Figure 5:
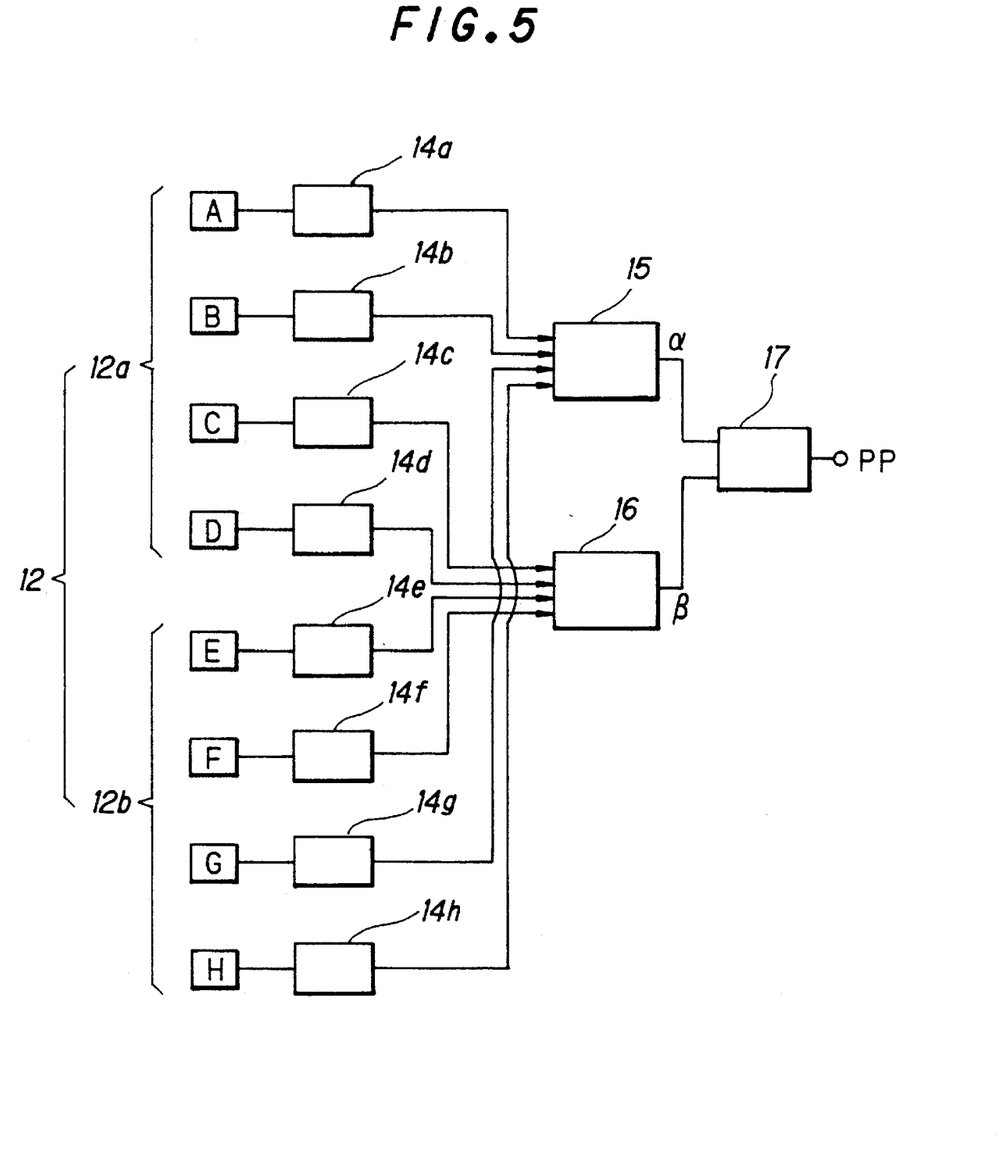
FIG. 5 is a block diagram of a signal-processing circuit for photodetectors in the light-emitting-and-receiving device shown in FIG. 4.
Figure 6:
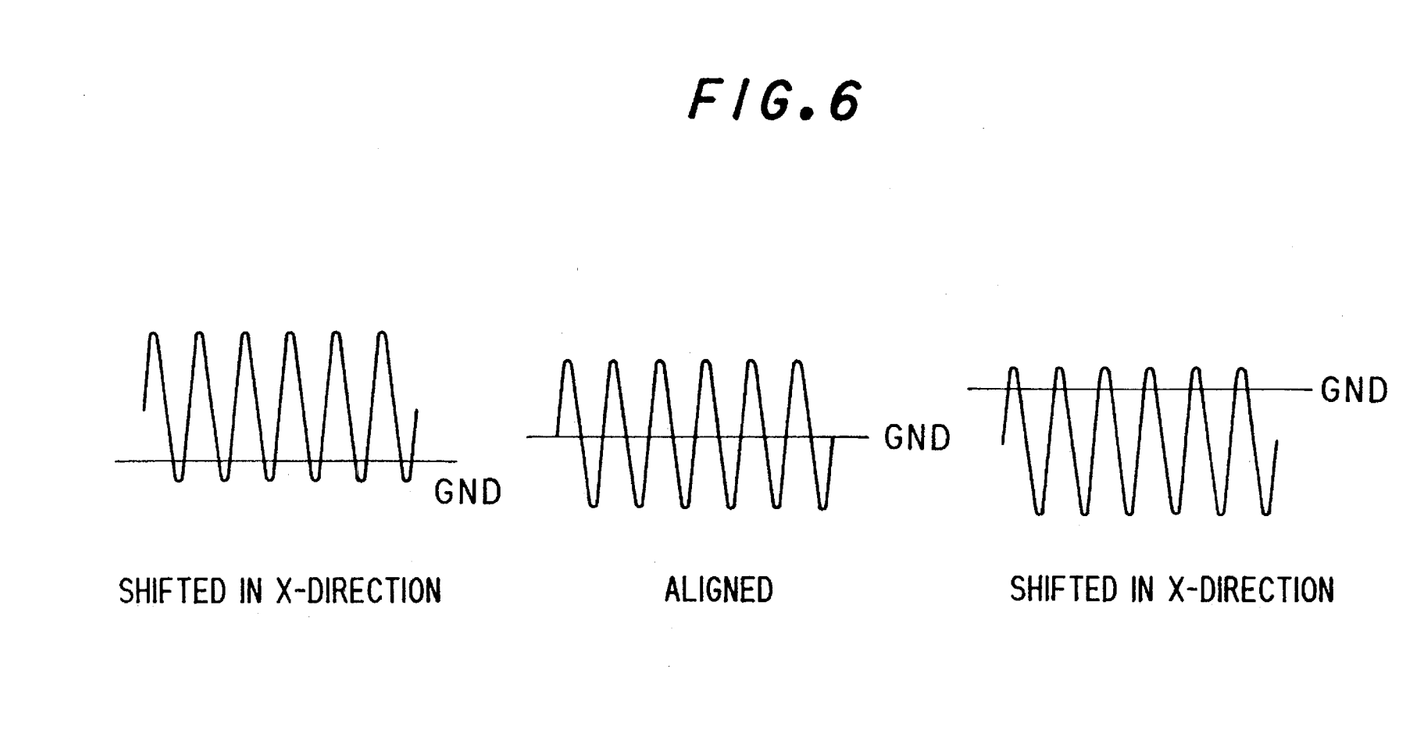
FIG. 6 is a graph illustrating variations in a push-pull signal caused by adjustments of the position of the light-emitting-and-receiving device shown in FIG. 4.

FIGS. 4–6 illustrate adjustment of the position of a light-emitting-and-receiving device in a radial direction of an optical disk. This light-emitting-and-receiving device is included in an optical pickup forming a first example of the invention. FIG. 4 shows an example of light-emitting-and-receiving device used in an optical pickup according to the invention, the optical pickup being for use in an optical disk drive.

The structure of this optical pickup is similar to the structure of the optical pickup already described in connection with FIGS. 1–3 except for the following points.

In FIG. 4, the light-emitting-and-receiving device, indicated by reference numeral 10, comprises a substrate 11, a light-receiving portion 12, and a laser 13. The light-receiving portion 12 and a laser 13 are in line in the track direction Y of the optical pickup on the substrate 11. It is assumed that the optical disk is engraved with pits to store data. The track direction Y is hereinafter also referred to as the pit direction. The light-receiving portion 12 consists of two arrays 12a and 12b of light-receiving elements. These two arrays 12a and 12b are in line in the track direction Y.

Each of the two arrays 12a and 12b consists of four light-receiving elements arrayed in the radial direction X of the optical disk. More specifically, the first array 12a is composed of four light-receiving elements A, B, C, and D as shown in FIG. 4. The second array 12b comprises four light-receiving elements E, F, G, and H.

FIG. 5 shows the electrical configuration of a signal-processing portion for processing output signals from the light-receiving elements A–H of the light-emitting-and-receiving device 10. The output signals from the light-receiving elements A–H, respectively, are amplified by I–V (current-to-voltage converter) amplifiers 14a–14h, respectively, and then supplied to a first adder circuit 15 or to a second adder circuit 16.

In this example, the first adder circuit 15 receives the output signals from the two light-receiving elements A and B on one side of the first array 12a and the output signals from the two light-receiving elements G and H on the opposite side of the second array 12b. The second adder circuit 16 receives the output signals from the two light-receiving elements C and D on the other side of the first array 12a and the output signals from the two light-receiving elements E and F on one side of the second array 12b.

Accordingly, a signal $\alpha$ given by $$\alpha = A + B + G + H$$

appears at the output terminal of the first adder circuit 15. A signal $\beta$ given by $$\beta = C + D + E + F$$

appears at the output terminal of the second adder circuit 16. These signals $\alpha$ and $\beta$ correspond to signals obtained from the prior art light-emitting-and-receiving device shown in FIGS. 1–3 to find a tracking error signal.

An arithmetic circuit 17 calculates a push-pull signal PP from these two signals $\alpha$ and $\beta$ according to the formula $$PP = \alpha - \beta = (A+B+G+H) - (C+D+E+F)$$

The push-pull signal PP exhibits the same amplitude in the positive and negative domains with respect to ground (GND) level, as shown in the center of FIG. 6, if the light-emitting-and-receiving device is placed in position in the radial direction of the disk and thus the optical axis is aligned. In this state, the offset of the push-pull signal is zero. On the other hand, if the light-emitting-and-receiving device 10 is out of position in the radial direction X, the offset of the push-pull signal PP is shifted into the positive or negative domain.

Therefore, if the light-emitting-and-receiving device 10 is shifted to the left as viewed in FIG. 4 in the radial direction X of the disk, then the offset of the push-pull signal PP assumes a positive (+) value. In this state, the push-pull signal PP takes the waveform shown at the left of FIG. 6. Conversely, if the light-emitting-and-receiving device 10 is shifted to the right in the radial direction X of the disk, then the offset of the push-pull signal PP assumes a negative (−) value. In consequence, the push-pull signal takes the waveform shown at the right of FIG. 3.

In the optical pickup equipped with the light-emitting-and-receiving device 10 of the structure described above, the light beam from the laser 13 of the light-emitting-and-receiving device 10 is directed via the objective lens to the recording surface of the optical disk which is used during an adjustment. Light returning from the optical disk is received by the light-receiving portion 12. At this time, the light beam is kept in focus. In response to the output signals from the light-receiving elements of the first and second arrays 12a and 12b, respectively, of the light-receiving portion 12, the first adder circuit 15 and the second adder circuit 16 produce output signals $\alpha$ and $\beta$, respectively. Then, the arithmetic circuit 17 calculates the push-pull signal PP from these output signals $\alpha$ and $\beta$.

The light-emitting-and-receiving device 10 is moved in the radial direction X of the disk so that the offset of the push-pull signal PP is made to be zero. In this way, the light-emitting-and-receiving device 10 is accurately placed in position in the radial direction X of the disk.

In the above example, as described above, the light beam is directed from the light-emitting portion of the light-emitting-and-receiving device to the recording surface of the optical disk via the objective lens. Light returning from the disk is received by the light-receiving portion. The light-emitting-and-receiving device is moved in the radial direction so that the offset of the push-pull signal created from the first and second sum signals becomes zero. As a result, the light-emitting-and-receiving device is precisely placed in position in the radial direction of the disk.

In the example described above, each of the arrays 12a and 12b of the light-receiving portion 12 of the laser coupler 10 consists of four light-receiving elements. It is to be noted that the structure of each array of light-receiving elements is not limited to this construction. Any other structure can be utilized as long as these light-receiving elements are arranged symmetrically and can be divided into two parts so that the push-pull signal PP can be calculated.

Figure 7:
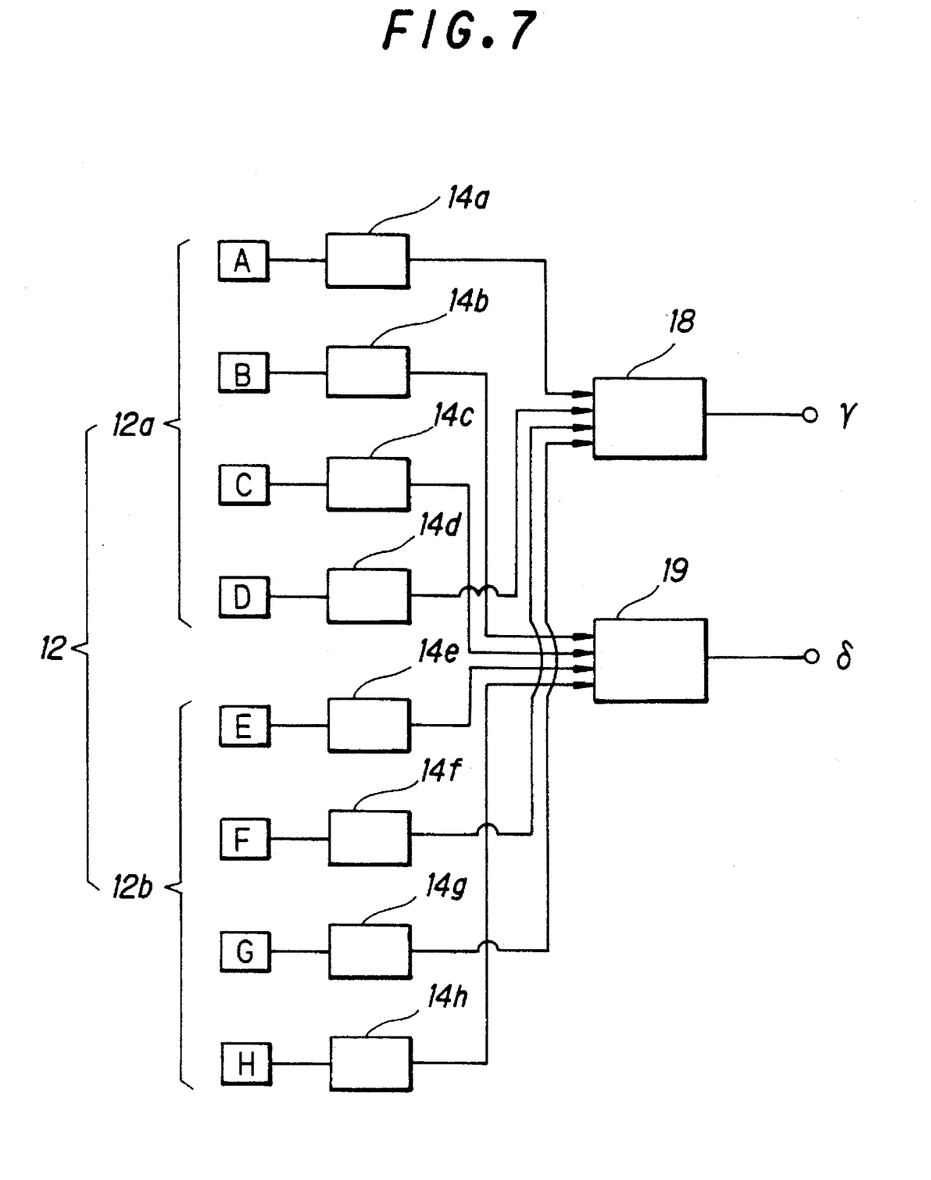
FIG. 7 is a block diagram of a signal-processing circuit for photodetectors in a light-emitting-and-receiving device incorporated in another optical pickup according to the invention, the optical pickup being incorporated in an optical disk drive.
Figure 8:
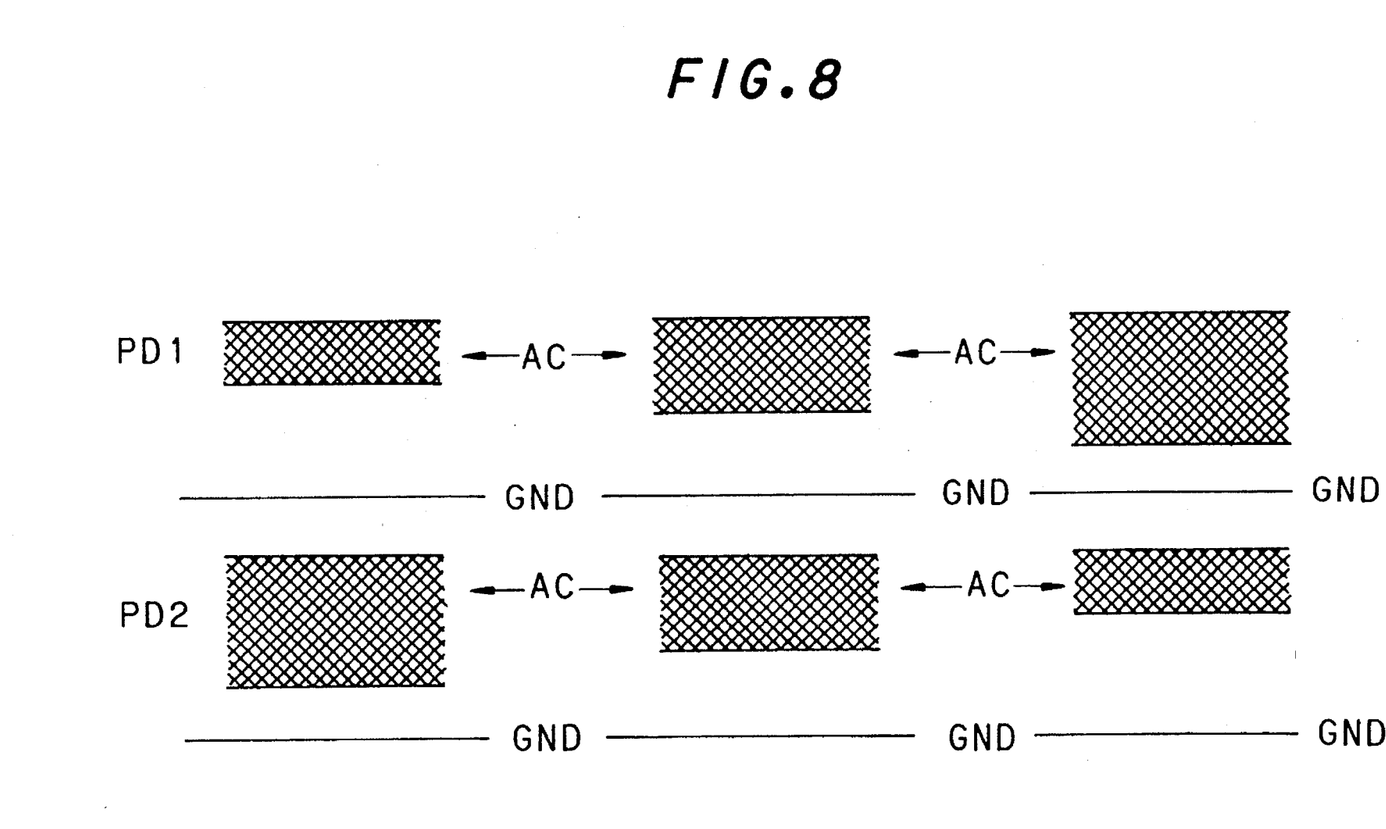
FIG. 8 is a graph illustrating variations in AC values caused by adjustments of the position of the light-emitting-and-receiving device shown in FIG. 7.

FIGS. 7 and 8 illustrate adjustment of the position of a light-emitting-and-receiving device in the track direction of the disk, the light-emitting-and-receiving device being incorporated in an optical pickup according to a second example of the invention. The structure of the light-emitting-and-receiving device is the same as the structure shown in FIG. 4 forming the first example.

FIG. 7 shows the electrical configuration of a signal-processing portion for processing output signals from light-receiving elements A–H of the light-emitting-and-receiving device 10. The output signals from the light-receiving elements A–H are amplified by current-to-voltage converter (I–V) amplifiers 14a–14h, respectively, and supplied to a first adder circuit 18 or to a second adder circuit 19.

In this configuration, the first adder circuit 18 receives the output signals from the two outer light-receiving elements A and D of the first array 12a and the two inner light-receiving elements F and G of the second array 12b. The second adder circuit 19 receives the output signals from the two inner light-receiving elements B and C of the first array 12a and the output signals from the two outer light-receiving elements E and H of the second array 12b.

Accordingly, a signal $\gamma$ given by $$\gamma = A + F + G + D$$

appears at the output terminal of the first adder circuit 18. A signal $\delta$ given by $$\delta = E + B + C + H$$

appears at the output terminal of the second adder circuit 19. These signals $\gamma$ and $\delta$ correspond to signals obtained from the prior art light-emitting-and-receiving device shown in FIGS. 1–3 to find a focusing error signal.

If the light-emitting-and-receiving device 10 is placed in position in the pit direction, the output signal γ from the first adder circuit 18 and the output signal δ from the second adder circuit 19 have the same AC value (AC component value) which indicates an amplitude. That is, the two peaks have the same amplitude, as shown in the middle of FIG. 8. On the other hand, if the light-emitting-and-receiving device 10 is out of position in the pit direction, the optical pickup is defocused. As a result, the AC values decrease.

In the case of FIG. 4, if the light-emitting-and-receiving device 10 is shifted downwardly in the pit direction Y, the AC value obtained from the first array 12a of light-emitting elements decreases, while the AC value derived from the second array 12b increases. The arrays 12a and 12b give rise to AC values as shown at the left of FIG. 8.

If the light-emitting-and-receiving device 10 is shifted upwardly in the pit direction Y, the AC value obtained from the first array 12a of light-emitting elements increases, while the AC value derived from the second array 12b decreases. The arrays 12a and 12b produce AC values as shown at the right of FIG. 8.

In the optical pickup equipped with the light-emitting-and-receiving device of the structure described above, the light beam from the laser 13 of the light-emitting-and-receiving device 10 is directed via the objective lens to the recording surface of the optical disk. Light returning from the optical disk is received by the light-receiving portion 12. In response to the output signals from the light-receiving elements of the first and second arrays 12a and 12b, respectively, of the light-receiving portion 12, the first adder circuit 18 and the second adder circuit 19 produce output signals γ and δ, respectively. These output signals γ and δ are compared. The light-emitting-and-receiving device 10 is moved in the pit direction Y so that these two output signals assume the same AC value. Consequently, the light-emitting-and-receiving device 10 is accurately placed in position in the pit direction Y.

The adjustment of the position of this light-emitting-and-receiving device 10 in the pit direction Y may be made after the position of the light-emitting-and-receiving device 10 is adjusted in the radial direction X of the disk as in the first example.

What is claimed is:

1. A method of adjusting optics of an optical pickup having a light-emitting-and receiving device and an objective lens, said light-emitting-and-receiving device being equipped with a light-emitting portion and a light-receiving portion on a substrate, said objective lens acting to focus a light beam produced by said light-emitting portion onto a recording surface of an optical disk and to guide returning light reflected by said recording surface toward said light-receiving portion, said light-receiving portion consisting of a first array of light-receiving elements and a second array of light-receiving elements, said first and second arrays being in line in a track direction of the optical disk, each of said first and second arrays consisting of a plurality of light-receiving elements arrayed in a radial direction of the disk, said method comprising the steps of:

adding output signals from plural outer light-receiving elements of said first array to output signals from at least one inner light-receiving element of said second array to produce a first sum signal;

adding an output signal from at least one inner light-receiving element of said first array to output signals from plural outer light-receiving elements of said second array to produce a second sum signal; and moving said light-emitting-and-receiving device in the tracking direction of the optical disk so that the first and second sum signals assume an identical value while comparing said first and second sum signals.

2. A method of adjusting optics of an optical pickup having a light-emitting-and-receiving device and an objective lens, said light-emitting-and-receiving device being equipped with a light-emitting portion and a light-receiving portion on a substrate, said objective lens acting to focus a light beam produced by said light-emitting portion onto a recording surface of an optical disk and to guide returning light reflected by said recording surface toward said light-receiving portion, said light-receiving portion consisting of a first array of light-receiving elements and a second array of light-receiving elements, said first and second arrays being in line in a track direction of the optical disk, each of said first and second arrays consisting of a plurality of light-receiving elements arrayed in a radial direction of the disk, said method comprising the steps of:

adding output signals from the light-receiving elements located on a first side of said first array to output signals from the light-receiving elements located on a second side of said second array to produce a first sum signal;

adding output signals from the light-receiving elements located on the second side of said first array to output signals from the light-receiving elements located on the first side of said second array to produce a second sum signal;

producing a difference signal between said first sum signal and said second sum signal;

moving said light-emitting-and-receiving device in the radial direction of the optical disk so that an offset of said difference signal is made to be zero;

adding output signals from plural outer light-receiving elements of said first array to an output signal from at least one inner light-receiving element of said second array to produce a third sum signal;

adding an output signal from at least one inner light-receiving element of said first array to output signals from plural outer light-receiving elements of said second array to produce a fourth sum signal; and moving said light-emitting-and-receiving device in the tracking direction of the optical disk so that said third and fourth sum signals assume an identical value while comparing these third and fourth sum signals.

\* \* \* \* \*